United States Patent [19]
Newby

[11] Patent Number: 5,860,247
[45] Date of Patent: Jan. 19, 1999

[54] GAS DRIVEN HYDROPONIC SYSTEM WITH A LIQUID PUMP OUTLET PIPE CONNECTED TO A VARIABLE BUOYANT FLOAT

[76] Inventor: John C. Newby, P.O. Box 989, Cobb, Calif. 95426

[21] Appl. No.: 918,381

[22] Filed: Aug. 26, 1997

[51] Int. Cl.[6] ............................. A01G 31/00; F16K 17/36
[52] U.S. Cl. ................................. 47/59; 47/62; 137/78.1; 137/78.2
[58] Field of Search ......................... 47/59, 62; 137/78.1, 137/78.2, 624.14

[56] References Cited

U.S. PATENT DOCUMENTS

| | | | |
|---|---|---|---|
| 1,297,719 | 3/1919 | Myers . | |
| 2,145,052 | 1/1939 | Lund | 137/78.1 |
| 2,306,027 | 12/1942 | Swaney | 47/59 |
| 2,388,179 | 10/1945 | Prowd . | |
| 3,127,108 | 3/1964 | Harris | 137/78.2 |
| 3,438,383 | 4/1969 | Gorlin | 137/78.1 |
| 3,900,134 | 8/1975 | Larson | 222/52 |
| 4,107,875 | 8/1978 | Bordine | 47/62 |
| 4,170,844 | 10/1979 | Steele . | |
| 4,177,604 | 12/1979 | Friesen | 47/62 |
| 4,189,867 | 2/1980 | Schneck . | |
| 4,211,037 | 7/1980 | Green | 47/80 |
| 4,245,433 | 1/1981 | Sjosted et al. | 47/59 |
| 4,393,890 | 7/1983 | Skappel | 137/78.2 |
| 4,527,353 | 7/1985 | Newby | 47/59 |
| 4,669,217 | 6/1987 | Fraze | 47/64 |
| 4,780,989 | 11/1988 | Mears et al. . | |
| 5,054,233 | 10/1991 | Evans . | |
| 5,067,275 | 11/1991 | Constance | 47/62 |
| 5,269,094 | 12/1993 | Wolverton et al. . | |
| 5,394,647 | 3/1995 | Blackford, Jr. . | |
| 5,501,037 | 3/1996 | Aldokimov et al. | 47/58 |
| 5,502,923 | 4/1996 | Bradshaw . | |

*Primary Examiner*—Michael J. Carone
*Assistant Examiner*—Frederick T. French III

[57] ABSTRACT

A multiple function hydroponics system consisting of three major components; a plant pot container, a reservoir container and a pumping chamber. The plant pot container has a drainage tube down into the reservoir, this drainage tube height is adjusted to determine the upper level that the liquid can reach within the plant pot container. For a ebb and flow type operation of the assembly there is a siphon tubes from the bottom of the plant pot container back into the pumping chamber to drain the plant pot container each cycle. For top down watering or a drip system a watering tube assembly is installed so that each plant has an fluid outlet opening. The liquid pumping chamber, which contains a cycling container, is connected to the bottom of the reservoir with tubing and a one way valve allowing liquid to enter. When in the top down watering mode, the height of the drainage tube within the plant pot container is lowered so as to allow complete drainage back into the reservoir. The incoming pressurized air coming into the pumping chamber enters at the lowest level so as to aerate the water. In operation with the cycling container resting near the bottom of the liquid pumping chamber the gas within the system is expanded in the pumping chamber, the resultant pressure build-up in turn force's liquid out of the cycling container tube and the siphoning tube. When the chamber's liquid reaches a predetermined level, the pressurized gas is released to the atmosphere through the cycling container tube, liquid from the plant pot container refills the pumping chamber through the siphon tube, and the reservoir as the pumping chamber is now open to the atmosphere. When the pumping chambers refill to a predetermined level, the cycling container sinks and the cycle repeats.

3 Claims, 6 Drawing Sheets

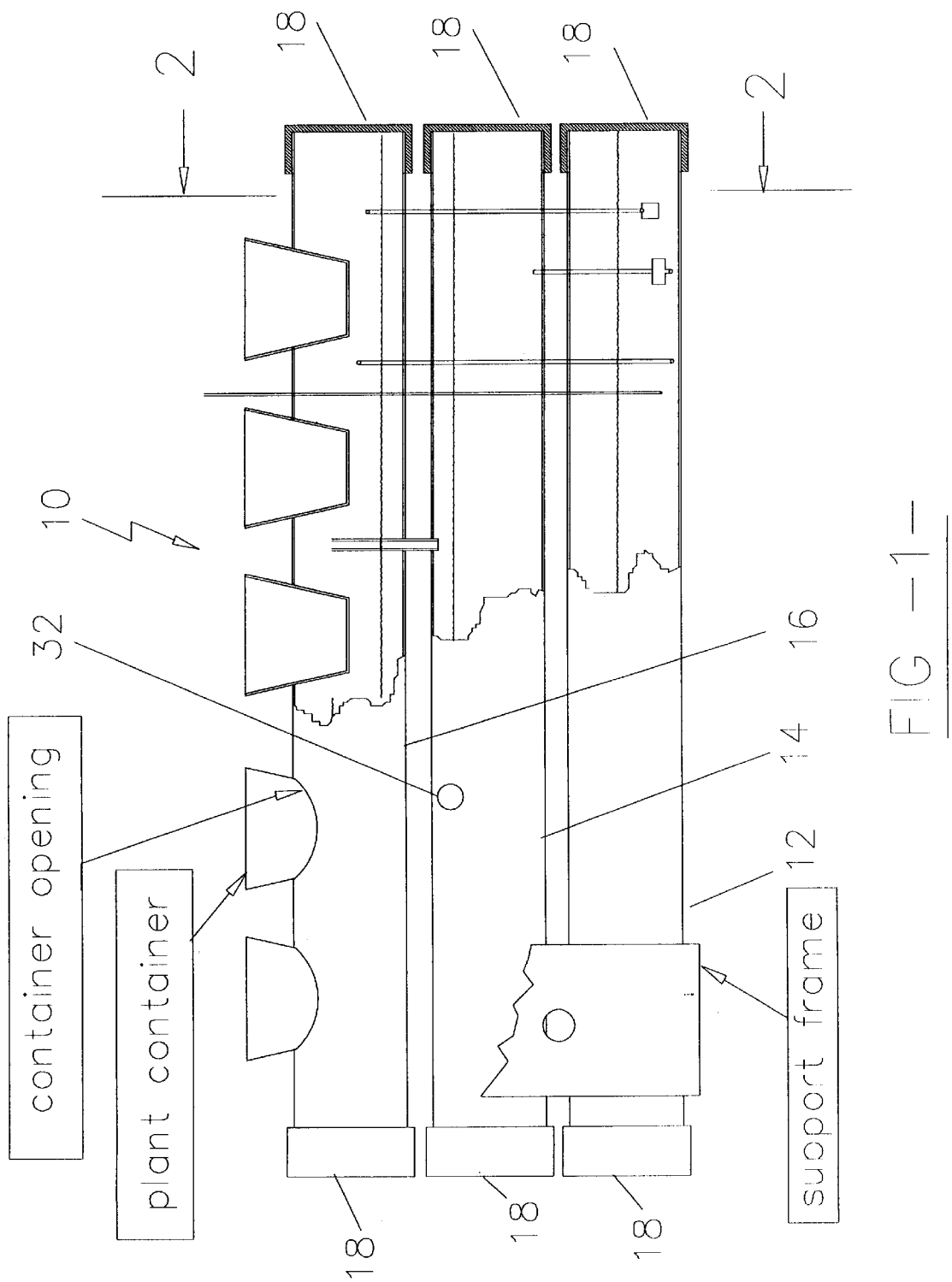
FIG-1-

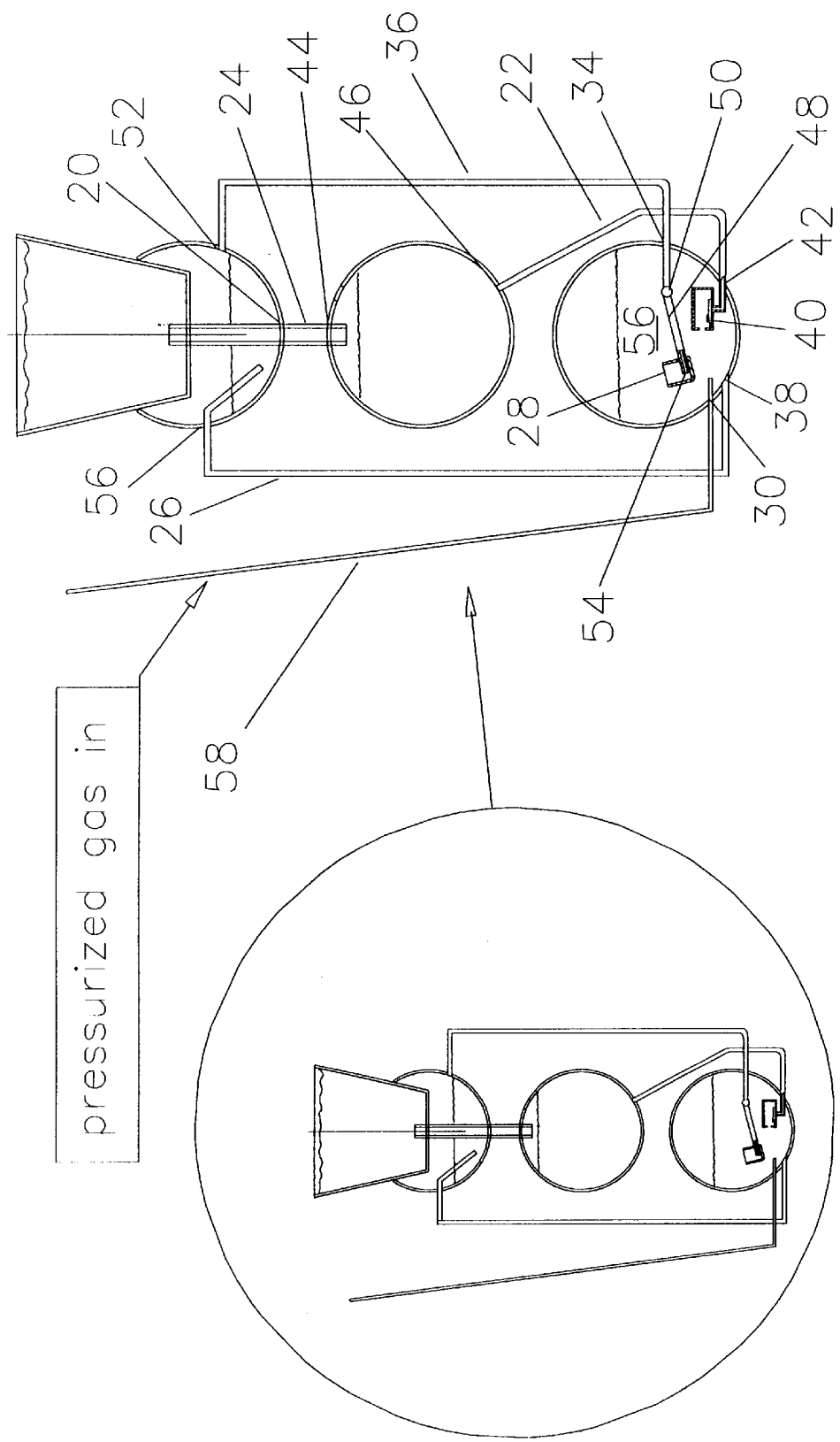

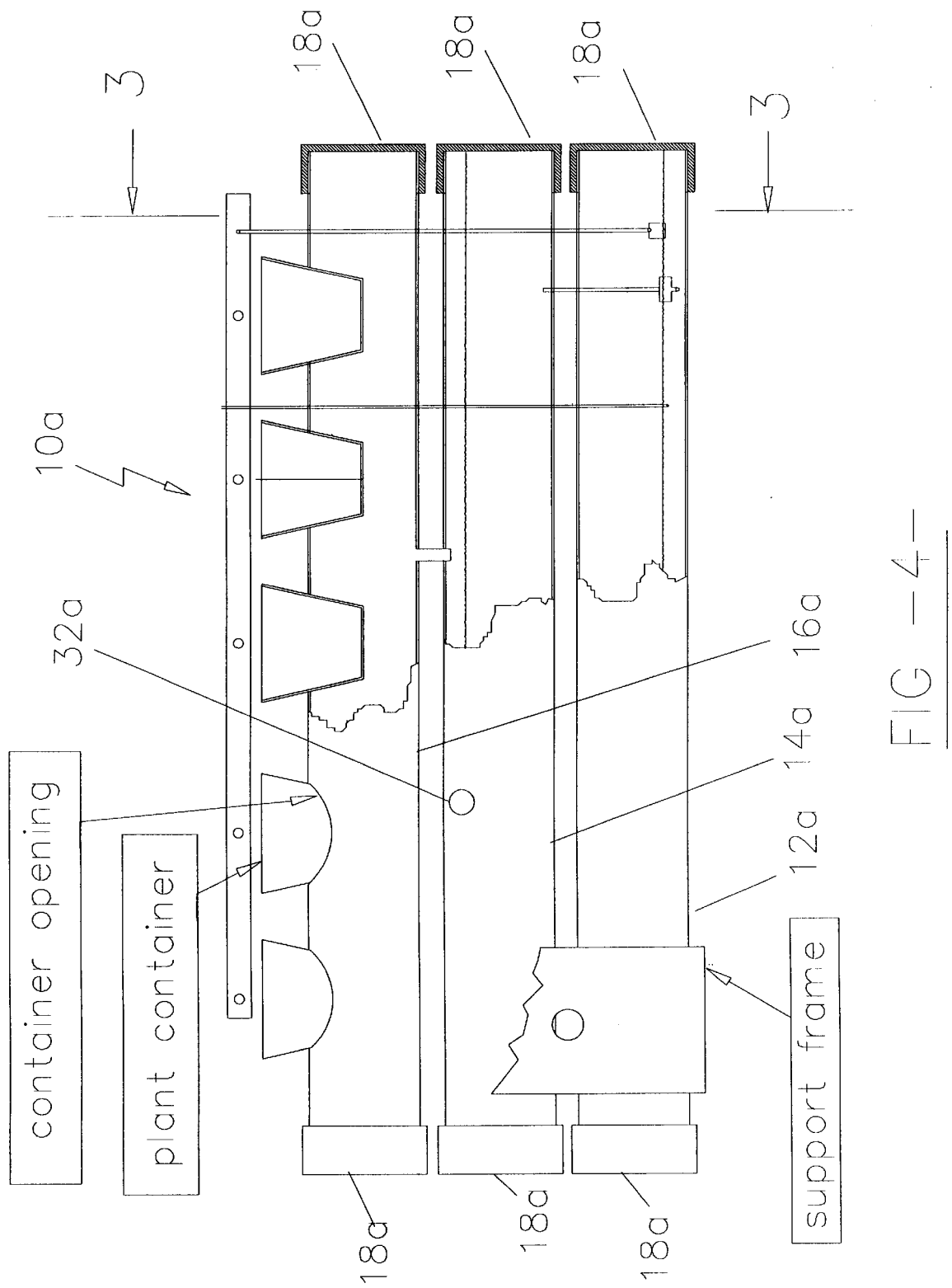

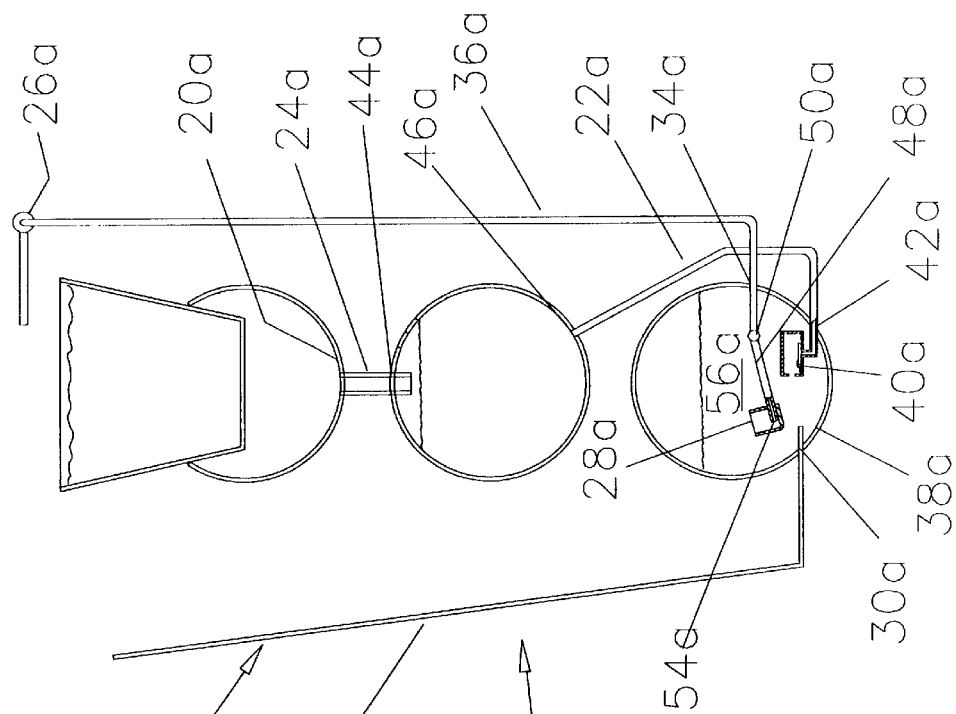
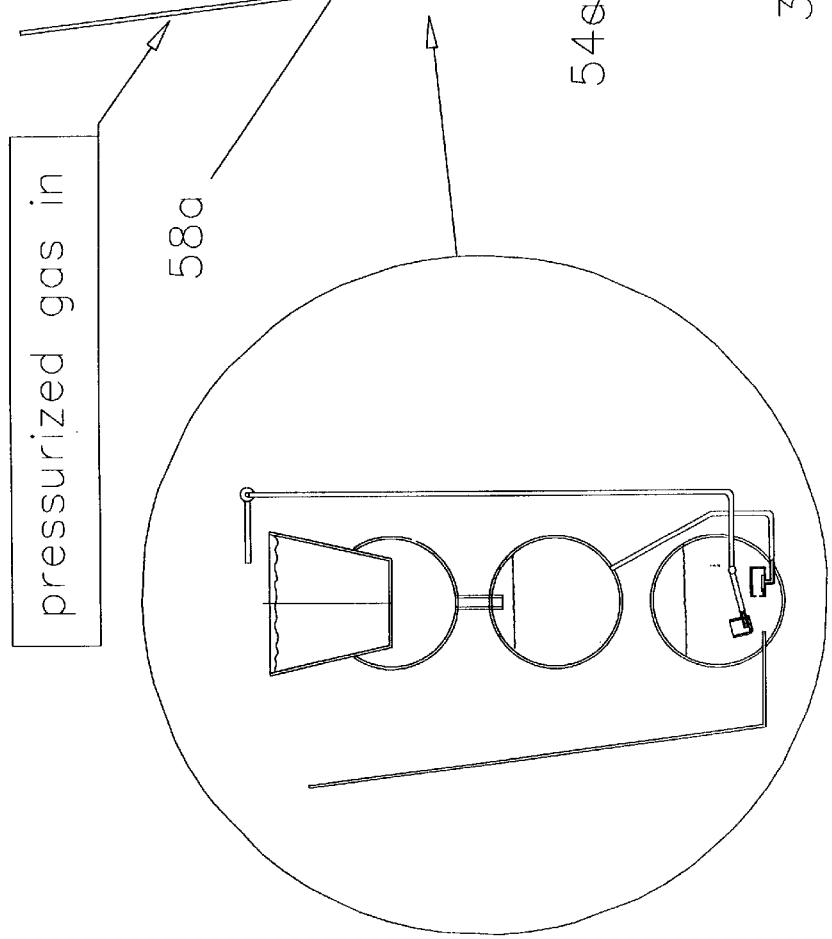

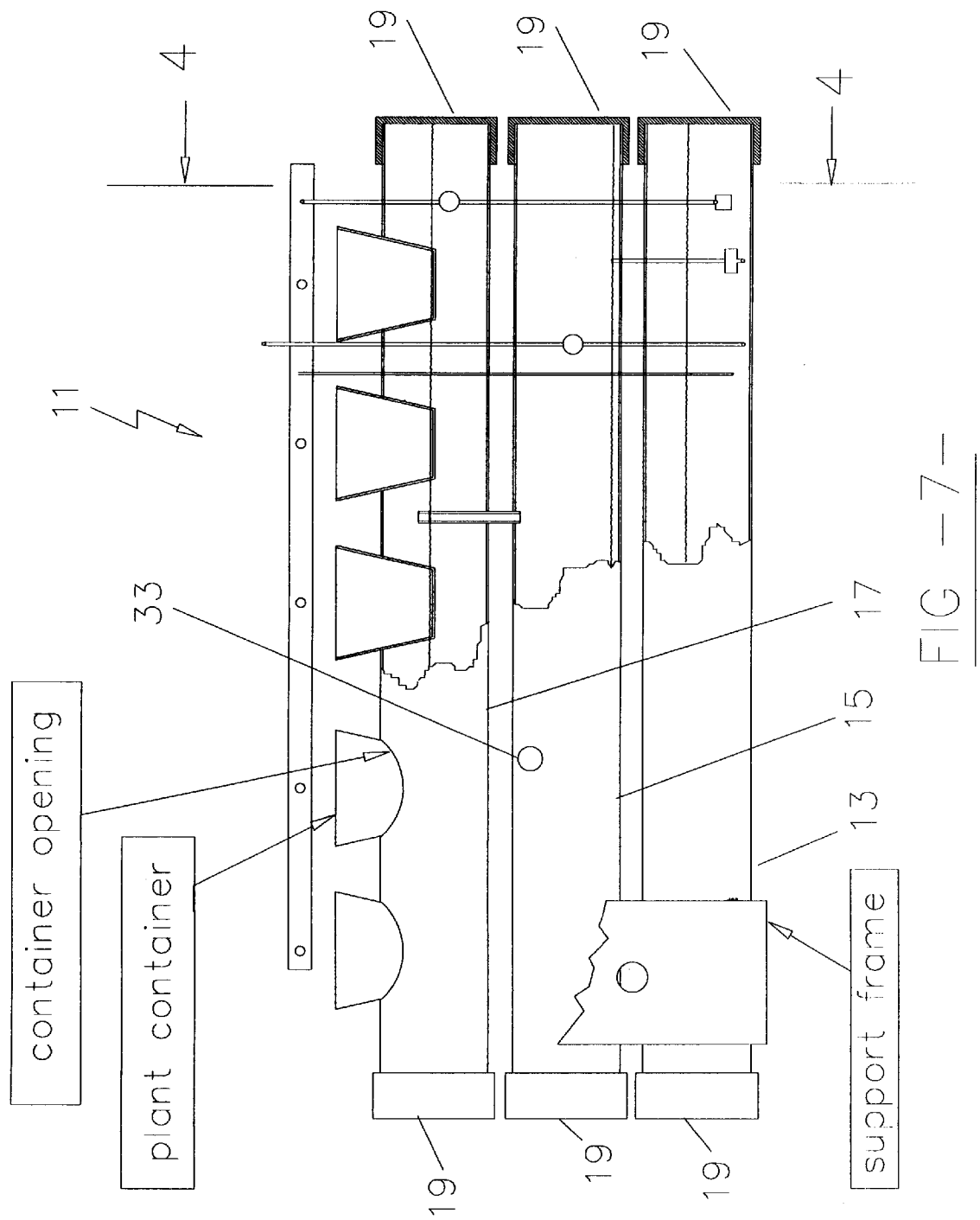

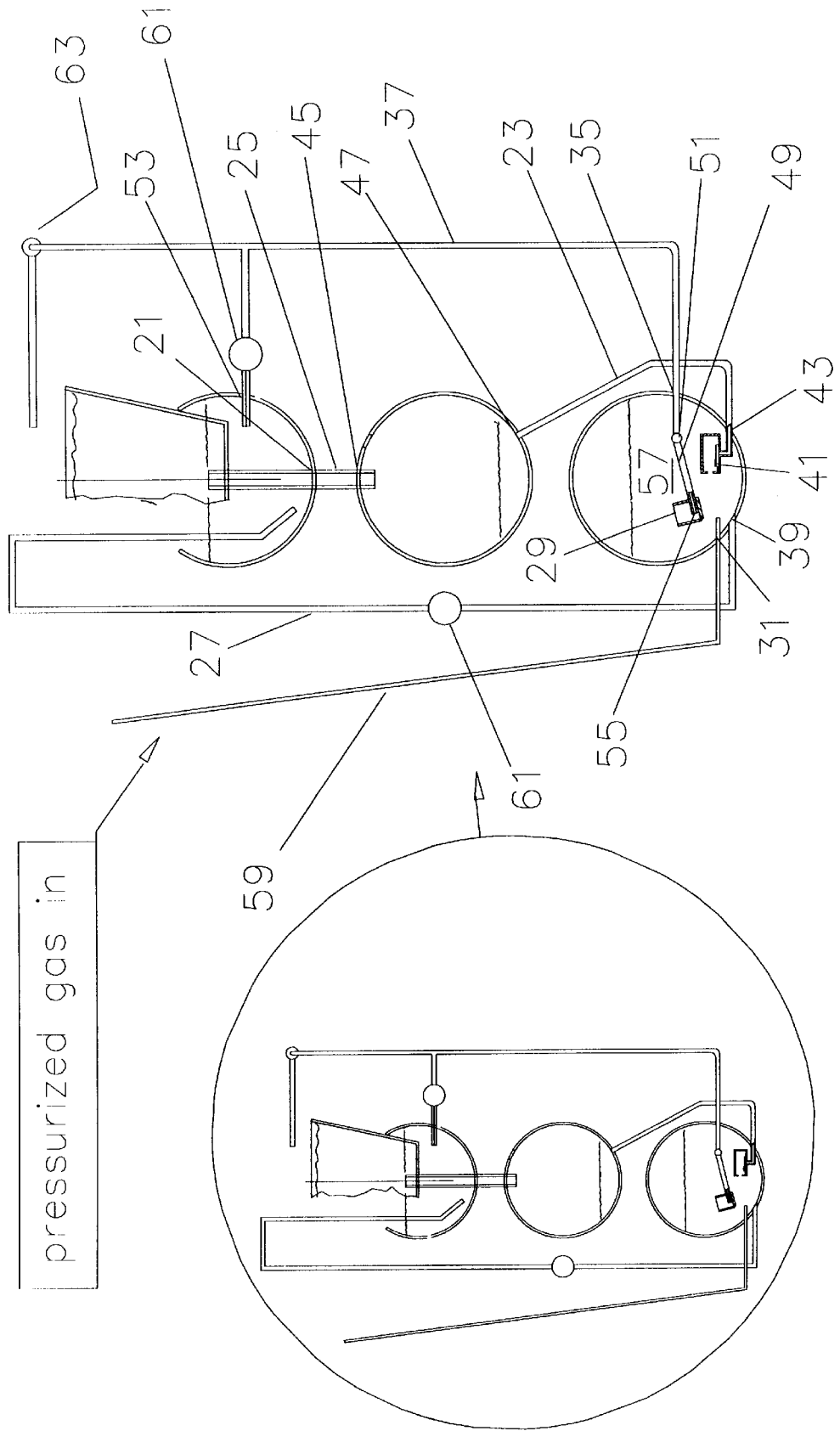

GAS DRIVEN HYDROPONIC SYSTEM WITH A LIQUID PUMP OUTLET PIPE CONNECTED TO A VARIABLE BUOYANT FLOAT

BACKGROUND OF THE INVENTION

1. Field of the invention

This invention relates generally to hydroponic systems and more particularly to hydroponic systems with a pump powered by expansion of air or gas.

This invention relates to the assembly and integration with an existing patent (described in U.S. Pat. No. 5,662,459 of Newby) which is a liquid pump, to components that will enable the pump to circulate the fluid in a multiple functioning hydroponic system.

2. Description of Prior Art

The addition of various chemicals to water had been found to produce a solution in which plant life flourished. By the 1920's the preparation of chemical mixtures had been standardized and various methods of usage of these mixtures had been developed. However not all of the methods had yet been developed.

The ebb and flo hydroponics method of growing plants was developed during the 1940's by Robert B. and Alice P. Withrow. They used inert gravel as the growing medium The plants were alternately flooded and then drained, thus giving the plants the maximum amounts of both nutrients and air to the plant roots. This method later become known as the gravel method of hydroponics and also as nutriuculture.

Another meted of applying the nutrient to the plants is that of sub-irrigation. The nutrients are periodically fed to the plants from below the roots. This method is called the sub irrigation method. It is very similar to the ebb and flo method. In present day large scale commercial greenhouses plants are grown from seeds or small plants to harvest. This process is mainly controlled by automation.

A modern example of an open system pump that can be used in the automated sub-irrigation or gravel method is found in U.S. Pat. No. 5,662,459 of Newby, a simplified version of an open system pump is shown. It is shown to include a hollow chamber, a cycling container disposed within the chamber, and a flapper type check valve.

Briefly, the invention includes a hollow chamber, with an attached float and a hollow cycling container, open at the top, disposed within the chamber. The cycling container is coupled to a pipe which is attached to a flexible tube joint near the bottom of the enclosure wall, the joint in turn is coupled to the a outer pipe on the outside of the enclosure. This allows communication between the cycling container and the outside pipe. When the cycling container is empty it becomes buoyant. Whenever the cycling container is buoyant the pressurized gas within the chamber will escape. Whenever the cycling container is submerged the gas entering through the input pipe will be contained and the pressure within the chamber will rise until it forces water out of the output pipe. The circular arc distance the cycling container can travel upward is determined by the length of the output pipe attached. Whenever the cycling container is raised to the level the pipe length will allow, the container will be rotated into a position that allows water to enter, the container loses its buoyancy and sinks to the bottom of the chamber. Once again the cycling container is submerged and the gas entering the chamber through the input pipe is again captured.

An advantage of the invention is that it is an open system mechanism, the gas is vented to the atmosphere between each cycle. This design allows for simplified construction and reduces the need for expensive pumps or timing mechanism to cycle the fluid.

Another advantage of this invention is the unique design of a cycling container to utilize the forces of buoyancy and gravity to recycle the system.

SUMMARY OF INVENTION

The present hydroponic assembly can be modified to operate in three different configurations. These configurations are for a sub irrigation system, a top down watering system and a combination system of these two methods. The major parts of the hydroponic assembly consist of three components, one of these is the liquid pumping chamber which contains a cycling container The remaining two components are a fluid reservoir container and a plant container. The three components are arranged such that the pumping chamber is located below the reservoir container and the plan pot container is located above the reservoir.

The plant pot container is connected to the pumping chamber by a siphon tube which is located such that a greater pressure is required to force liquid upward through the siphon from the pumping chamber into the plant pot container, than is required by the cycling container tubing. The plant pot container also has a height adjustable drainage pipe outlet, which can be adjusted for the level of liquid required within the plant pot container. This pipe extends down into the reservoir container. The pumping chamber is connected to the bottom of the reservoir container with tubing and a one way valve that only allows liquid to enter the chamber.

In operation, the gas within the system is expanded, by an external source and enters the pumping chamber near the bottom of the chamber which aerates the liquid. The resultant pressure produced forces liquid out of the pumping chamber and out of the cycling container tube and up the siphon tube. Nearly all of the liquid is transported up through the cycling container outlet tubing. And according to which hydroponic method is used, can be either attached to a distribution pipe (the drip down method) or into the wall of the plant pot container (the sub-irrigation method). This continues until the pumping chamber is nearly empty and the pressurized gas is released through the cycling container outlet tubing. At this point the pressure is at atmospheric and the chamber begins to refill. Most of the refill fluid return is from the siphon tube (when it is a sub-irrigation system) because of its higher pressure head, the remaining comes from the reservoir. With the drip down method the siphon tube is not used and the overflow tube is removed and all of the liquid returns to the reservoir. When using the combination of both methods the siphon tube, at the plant container, must be located such that it is at a higher level than the drip down pipe. Also the overflow pipe must be in place. Whatever method is used once the pumping chamber is filled to a predetermined level and the cycling container has sunk, the chamber is no longer open to the atmosphere, the pressure builds up and the cycle repeats.

The advantage of the present invention is that it is an open system mechanism, i.e., the gas and/or air is vented to the atmosphere between each cycle. This design allows for simplified construction and reduces the need for expensive pumps or timing mechanism.

Another advantage of this present invention is that unique design of a cycling container to utilizes the forces of buoyancy and gravity to recycle the system.

Another advantage of this present invention is that it can function with only one valve limiting the number of wearing parts.

The simple embodiments of this invention would not require any machining.

Another advantage of this present invention is that it can function within a wide range of temperatures, from near freezing to above boiling.

Another advantage of this present invention is that it can function with different pressure sources.

Another advantage of this present invention is that it can function in three different modes.

BRIEF DESCRIPTION OF THE DRAWING

FIG. 1 is an elevational view of a preferred embodiment of the present invention.

FIG. 2 is a cross section taken along line 2—2 of FIG. 1 with the pump in the pressure position of its cycle.

FIG. 3 is a enlarged view of FIG. 2.

FIG. 4 is an elevational view of a alternate embodiment of the present invention.

FIG. 5 is a cross section taken along line 3—3 of FIG. 4 with the pump in the pressure position of its cycle.

FIG. 6 is a enlarged view of FIG. 5.

FIG. 7 is an elevational view of a alternate embodiment of the present invention.

FIG. 8 is a cross section taken along line 4—4 of FIG. 7 with the pump in the pressure position of its cycle.

FIG. 9 is a enlarged view of FIG. 8

DETAILED DESCRIPTION OF THE PREFERRED EMBODIMENT(S)

Referring to FIGS. 1–3. A hydroponics system assembly 10. In accordance with the present invention includes three pipe shaped components a pumping chamber 12, a reservoir container 14, located above the pumping chamber and a plant pot container 16, located above the reservoir container 14. Each of these pipe components has both ends sealed with water and airtight removable end cap 18. The plant pot container 16 is a cylindrical pipe but can be made in any appropriate shape is provided with three orifices, one orifice 20 allows communication between the plant pot container 16 and the reservoir container 14 through reservoir height adjustable overflow pipe 24. A second orifice 56 allows communication between plant pot container 16 and pumping chamber 12 through siphon tube 26. The third orifice 52 allows communication between pumping chamber 12 and plant pot container 16 through outlet tube 36. The plant pot container 16 has plant pot openings the number of these openings depends on the length of the pipe and the plant spacing required. The pumping chamber 12 is a cylindrical pipe but can be made in any appropriate shape is provided with four orifices. One orifice 30 allows communication with gas inlet pipe 58. A second orifice 34 allows communication between pumping chamber 12 and plant pot container 16 through liquid and gas outlet pipe 36. A third orifice 38 allows communication between pumping chamber 12 and plant container 16 through liquid siphon tube 26. The fourth orifice 42 allows communication between flapper valve 40 and reservoir container 14 through inlet pipe 22. The reservoir container 14 is a cylindrical pipe but can be made in any appropriate shape has three orifices. One orifice 44 allows communication between plant pot container 16 and reservoir container 14 through overflow pipe 24. The second orifice 46 allows communication between reservoir container 14 and pumping chamber 12 through inlet pipe 22. The third orifice is the reservoir refill opening 32. Within the pumping chamber 12, output pipe 48 is connected to swivel coupling 50. Output pipe 48 is connected to cycling container 28 The orifice 54 located within the cycling container to be positioned so as to evacuate the maximum container liquid 56 when the cycling container is resting near the bottom of the pumping chamber 12.

The operation of the present invention will be discussed with reference to FIGS. 1–3 The beginning of the cycle is shown in FIG. 3. A external source of pressurized gas or air enters the liquid pumping chamber 12 through gas inlet pipe 58. The chamber liquid 56 is forced out of the chamber through the end of the output tube end 54 located within the cycling container 28. The one way flapper valve 40 closes because of the pressure increase. When the chamber liquid 56 has been lowered to a predetermined level pressurized gas vents itself through the output tube 48. The reservoir water pressure is now greater than the pumping chamber 12 pressure. The liquid in the siphon tube 26 is forced back into the pumping chamber by its weight and the atmospheric pressure any remaining fluid is forced from the reservoir through flapper valve 40 flows into the pumping chamber 12. The cycling container, now buoyant, rises as the chambers refills. The flexible joint 50 near the lower chamber wall, travels in a vertical circular arc as the water moves upward. At a predetermined point the cycling container will began to fill with water, and when partially filled it is no longer buoyant. It sinks to the bottom of the chamber. The pressurized gas can no longer vent to the atmosphere. The gas now contained begins to exert pressure on the surface of the chamber liquid. The cycle repeats.

Referring to FIGS. 4–6 An alternate hydroponic system, a top down watering hydroponic assembly 10a. In accordance with the present invention includes three major pipe shaped components a pumping chamber 12a, a reservoir container 14a, located above the pumping chamber and a plant pot container 16a located above the reservoir container 14a. Each of these pipe components has both ends sealed with water and airtight removable end cap 18a. The plant pot container 16a is a cylindrical pipe but can be made in any appropriate shape is provided with one orifice, this orifice 20a allows communication between the plant pot container 16a and the reservoir container 14a through reservoir drain pipe 24a. The plant pot container 16a has plant pot openings the number of these openings depends on the length of the pipe and the plant spacing required. The pumping chamber 12a is a cylindrical pipe but can be made in any appropriate shape is provided with three orifices. One orifice 30a allows communication with gas inlet pipe 58a. A second orifice 34a allows communication between pumping chamber 12a and tubing assembly 26a through liquid and gas outlet pipe 36a. The third orifice 42a allows communication between flapper valve 40a and reservoir container 14a through inlet pipe 22a. The reservoir container 14a is a cylindrical pipe but can be made in any appropriate shape has three orifices. One orifice 44a allows communication between plant pot container 16a and reservoir container 14a through overflow pipe 24a. The second orifice 46a allows communication between reservoir container 14a and pumping chamber 12a through inlet pipe 22a. The third orifice is the reservoir refill opening 32. Within the pumping chamber 12a, output pipe 48a is connected to swivel coupling 50a. Output pipe 48a is connected to cycling container 28a The orifice 54a located within the cycling container to be positioned so as to evacuate the maximum container liquid 56a when the cycling container is resting near the bottom of the pumping chamber 12a.

The operation of the present invention will be discussed with reference to FIGS. 4–6. The beginning of the cycle is shown in FIG. 6. A external source of pressurized gas or air enters the liquid pumping chamber 12a through gas inlet pipe 58a. The chamber liquid 56a is forced out of the chamber through the end of the output tube end 54a located within the cycling container 28a. The one way flapper valve 40a closes because of the pressure increase. When the chamber liquid has been lowered to a predetermined level pressurized gas vents itself through the output tube 48a. The reservoir water pressure is now greater than the pumping chamber 12a pressure. fluid forced from the reservoir through flapper valve 40a flows into the pumping chamber 12a. The cycling container, now buoyant, rises as the chambers refills. The flexible joint 50a near the lower chamber wall, travels in a vertical circular arc as the water moves upward. At a predetermined point the cycling container will began to fill with water. and when partially filled it is no longer buoyant. It sinks to the bottom of the chamber. The pressurized gas can no longer vent to the atmosphere. The gas now contained begins to exert pressure on the surface of the chamber liquid. The cycle repeats.

Referring to FIGS. 7–9. An alternate hydroponic assembly, a combination sub-irrigation and top down watering hydroponic system 11. In accordance with the present invention includes three major pipe shaped components a pumping chamber 13, a reservoir container 15, located above the pumping chamber and a plant pot container 17, located above the reservoir container 15. Each of these pipe components has both ends sealed with water and airtight removable end cap 19. The plant pot container 17 is a cylindrical pipe but can be made in any appropriate shape is provided with two orifices, one orifice 21 allows communication between the plant pot container 17 and the reservoir container 15 through reservoir height adjustable overflow pipe 25. The second orifice 53 allows communication with control valve 61 through outlet tube 37. The plant pot container 17 has plant pot openings the number of these openings depends on the length of the pipe and the plant spacing required. The pumping chamber 13 is a cylindrical pipe but can be made in any appropriate shape is provided with four orifices. One orifice 31 allows communication with gas inlet pipe 59. A second orifice 35 allows communication between pumping chamber 13, distribution tubing assembly 63 and control valve 61 through liquid and gas outlet pipe 37. A third orifice 39 allows communication between pumping chamber 13 and control valve 61 through liquid siphon tube 27. The fourth orifice 43 allows communication between flapper valve 41 and reservoir container 15 through inlet pipe 23. The reservoir container 15 is a cylindrical pipe but can be made in any appropriate shape has three orifices. One orifice 45 allows communication between plant pot container 17 and reservoir container 15 through overflow pipe 25. The second orifice 47 allows communication between reservoir container 15 and pumping chamber 13 through inlet pipe 23. The third orifice is the reservoir refill opening 33. Within the pumping chamber 13. output pipe 49 is connected to swivel coupling 51. Output pipe 49 is also connected to cycling container 29 The orifice 55 located within the cycling container to be positioned so as to evacuate the maximum container liquid 57 when the cycling container is resting near the bottom of the pumping chamber 13. The control of the operating mode of this system is determined by die two control valves 61. One valve located inline on siphon tube 27, the other located inline on outlet tube 37. With both valves open to liquid flow the system is in the sub-irrigation mode. With both valves closed to liquid flow the system is in the top down watering mode.

The operation of the present invention will be discussed with reference to FIGS. 7–9. The beginning of the cycle is shown in FIG. 9. A external source of pressurized gas or air enters the liquid pumping chamber 13 through gas inlet pipe 59. The chamber liquid 57 is forced out of the chamber through the end of the output tube end 55 located within the cycling container 29. The one way flapper valve 41 closes because of the pressure increase. When the chamber liquid has been lowered to a predetermined level pressurized gas vents itself through the output tube 49. The reservoir water pressure is now greater than the pumping chamber 13 pressure. The liquid in the siphon tube 27 is forced back into the pumping chamber by its weight and the atmospheric pressure any remaining fluid is forced from the reservoir through flapper valve 41 flows into the pumping chamber 13. The cycling container, now buoyant, rises as the chambers refills. The flexible joint 51 near the lower chamber wall, travels in a vertical circular arc as the water moves upward. At a predetermined point the cycling container will began to fill with water, and when partially filed it is no longer buoyant. It sinks to the bottom of the chamber. The pressurized gas can no longer vent to the atmosphere. The gas now contained begins to exert pressure on the surface of the chamber liquid. The cycle repeats.

While this invention has been described in terms of a few preferred embodiments, it is contemplated that persons reading the proceedings descriptions and studying the drawings will realize various alterations, permutations and modifications thereof. It is therefore intended that the following appended claims be interpreted as including all such alterations, permutations and modification as fall within the true spirit and scope of the present invention.

What is claimed is:

1. A sub-irrigation hydroponic system assembly adapted to circulate liquid with a gas pressure driven pump between a liquid reservoir and a plant pot container, said hydroponic system assembly having a source of pressurized gas, said hydroponic system assembly comprising:

(a) a pumping chamber, a liquid reservoir, and a plant pot containing chamber, said pumping chamber, being coupled to said pressurized gas source, having, a gas input pipe permitting communication between said pressurized gas source and said pumping chamber through an input orifice, and a liquid output pipe permitting communication with said plant pot containing chamber and said pumping chamber through an output orifice, and a liquid input pipe permitting communication between said pumping chamber and said liquid reservoir through a liquid input orifice, and a liquid input pipe permitting communication between said pumping chamber and said plant pot containing chamber through an input orifice, said liquid reservoir having a liquid orifices permitting communication between said liquid reservoir and said pumping chamber through an output orifice, and permitting communication with said liquid reservoir and said plant pot containing chamber through an input orifice, said plant pot container chamber having plant pot container openings for holding plant pot containers, and an input pipe for communication between said pumping chamber and said plant pot containing chamber through an input orifice, an output pipe for communication between said liquid reservoir and said plant pot containing chamber through an output orifice, and an output pipe for communication between said plant pot containing chamber and said pumping chamber through an output orifice, a hollow cycling container contained within said pumping chamber, having variable buoyancy, said hollow cycling container being buoyant when nearly empty, said hollow cycling container coupled to said output orifice of said pumping chamber with said gas and liquid output pipe permitting communication between said hollow cycling container and said plant pot containing chamber, (b) said hollow cycling container adapted to sink when liquid in said pumping chamber rises above a predetermined level; and (c) a first swivel joint coupled to said hollow cycling container and said gas and liquid output pipe allowing travel in a vertical circular arc of said hollow cycling container, as liquid rises, or as said hollow cycling container sinks; and (d) a first check valve associated with liquid input pipe in said pumping chamber allowing one way flow of liquid into said pumping chamber from said liquid reservoir; and (e) said output pipe permitting communication between said plant pot container chamber and said pumping chamber allows liquid to be syphoned from said plant pot container chamber into said pumping chamber when the pressure within said pumping chamber is atmospheric pressure; and (f) said gas input pipe permitting communication between said pressurized gas source and said pumping chamber allows pressurized gas to flow into the said pumping chamber through the said input orifice; and (g) said output pipe for communication between said liquid reservoir and said plant pot containing chamber through an output orifice allows adjustable level control of a liquid within said plant pot container chamber by allowing overflow to drain from said plant pot container chamber into said liquid reservoir; and (h) wherein said input pipe permitting communication between said pumping chamber and said plant pot container chamber permits communication of a liquid from said pumping chamber to the plant pot container chamber to effect a sub-irrigation hydroponic system.

2. A top-down watering hydroponic system assembly adapted to circulate liquid with a gas pressure driven pump between a liquid reservoir and a plant pot container, said hydroponic system assembly having a source of pressurized gas, said hydroponic system assembly comprising:

(a) a pumping chamber, a liquid reservoir, and a plant pot containing chamber, said plant pot container chamber having plant pot container openings for holding plant pot containers, said pumping chamber, being coupled to said pressurized gas source, having, a gas input pipe permitting communication between said pressurized gas source and said pumping chamber through an input orifice, and a liquid output pipe permitting communication with said plant pot containers and said pumping chamber through an output orifice, and a liquid input pipe permitting communication between said pumping chamber and said liquid reservoir through a liquid input orifice, and a liquid input pipe permitting communication between said pumping chamber and said plant pot containing chamber through an input orifice, said liquid reservoir having a liquid orifices permitting communication between said liquid reservoir and said pumping chamber through an output orifice, and permitting communication with said liquid reservoir and said plant pot containing chamber through an input orifice, said plant pot containing chamber having plant pot container openings for holding plant pot containers, and an input pipe for communication between said pumping chamber and said plant pot containing chamber through an input orifice, an output pipe for communication between said liquid reservoir and said plant pot containing chamber through an output orifice, and an output pipe for communication between said plant pot containing chamber and said pumping chamber through an output orifice, a hollow cycling container contained within said pumping chamber, having variable buoyancy, said hollow cycling container being buoyant when nearly empty, said hollow cycling container coupled to said output orifice of said pumping chamber with said gas and liquid output pipe permitting communication between said hollow cycling container and said plant pot containing chamber, (b) said hollow cycling container adapted to sink when liquid in said pumping chamber rises above a predetermined level; and (c) a first swivel joint coupled to said hollow cycling container and said gas and liquid output pipe allowing travel in a vertical circular arc of said hollow cycling container, as liquid rises, or as said hollow cycling container sinks; and (d) a first check valve associated with liquid input pipe in said pumping chamber allowing one way flow of liquid into said pumping chamber from said liquid reservoir; and (e) said output pipe permitting communication between said plant pot container chamber and said pumping chamber allows liquid to be syphoned from said plant pot container chamber into said pumping chamber when the pressure within said pumping chamber is atmospheric pressure; and (f) said gas input pipe permitting communication between said pressurized gas source and said pumping chamber allows pressurized gas to flow into the said pumping chamber through the said input orifice; and (g) said output pipe for communication between said liquid reservoir and said plant pot containing chamber through an output orifice allows adjustable level control of a liquid within said plant pot container chamber by allowing overflow to drain from said plant pot container chamber into said liquid reservoir; and (h) wherein said input pipe permitting communication between said pumping chamber and said plant pot containers permits communication of a liquid from said pumping chamber to each plant pot container which is located within said plant pot container openings in said plant pot container chamber to effect top-down watering; and (I) a first control valve means associated with said input pipe to control the flow of liquid into said plant pot containers.

3. A combination sub-irrigation and top-down watering hydroponic system assembly adapted to circulate liquid with a gas pressure driven pump between a liquid reservoir and a plant pot container, said hydroponic system assembly having a source of pressurized gas, said hydroponic system assembly comprising:

(a) a pumping chamber, a liquid reservoir, and a plant pot containing chamber, said pumping chamber, being coupled to said pressurized gas source, having, a gas input pipe permitting communication between said pressurized gas source and said pumping chamber through an input orifice, and a liquid output pipe permitting communication with said plant pot containing chamber and said pumping chamber through an output orifice, and a liquid input pipe permitting communication between said pumping chamber and said liquid reservoir through a liquid input orifice, and a liquid input pipe permitting communication between said pumping chamber and said plant pot containing chamber through an input orifice, said liquid reservoir having a liquid orifices permitting communication between said liquid reservoir and said pumping chamber through an output orifice, and permitting communication with said liquid reservoir and said plant pot containing chamber through an input orifice, said plant pot container chamber having plant pot container openings for holding plant pot containers, and an input pipe for communication between said pumping chamber and said plant pot containing chamber through an input orifice, an output pipe for communication between said liquid reservoir and said plant pot containing chamber through an output orifice, and an output pipe for communication between said plant pot containing chamber and said pumping chamber through an output orifice, a hollow cycling container contained within said pumping chamber, having variable buoyancy, said hollow cycling container being buoyant when nearly empty, said hollow cycling container coupled to said output orifice of said pumping chamber with said gas and liquid output pipe permitting communication between said hollow cycling container and said plant pot containing chamber, (b) said hollow cycling container adapted to sink when liquid in said pumping chamber rises above a predetermined level; and (c) a first swivel joint coupled to said hollow cycling container and said gas and liquid output pipe allowing travel in a vertical circular arc of said hollow cycling container, as liquid rises, or as said hollow cycling container sinks; and (d) a first check valve associated with liquid input pipe in said pumping chamber allowing one way flow of liquid into said pumping chamber from said liquid reservoir; and (e) said output pipe permitting communication between said plant pot container chamber and said pumping chamber allows liquid to be syphoned from said plant pot container chamber into said pumping chamber when the pressure within said pumping chamber is atmospheric pressure; and (f) said gas input pipe permitting communication between said pressurized gas source and said pumping chamber allows pressurized gas to flow into the said pumping chamber through the said input orifice; and (g) said output pipe for communication between said liquid reservoir and said plant pot containing chamber through an output orifice allows adjustable level control of a liquid within said plant pot container chamber by allowing overflow to drain from said plant pot container chamber into said liquid reservoir; and (h) wherein said input pipe permitting communication between said pumping chamber and said plant pot container chamber is adapted to also permit communication of a liquid from said pumping chamber to a plant pot container which is located within said plant pot container openings in said plant pot container chamber to effect top-down watering; and (I) a first control valve means associated with said input pipe to control the flow of liquid into said plant pot container.

\* \* \* \* \*